United States Patent
Suh et al.

(10) Patent No.: US 12,035,176 B2
(45) Date of Patent: Jul. 9, 2024

(54) QOS MANAGEMENT METHOD AND DEVICE USING NAS PROTOCOL

(71) Applicant: Samsung Electronics Co., Ltd., Suwon-si (KR)

(72) Inventors: Kyungjoo Suh, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 17/598,623

(22) PCT Filed: Mar. 30, 2020

(86) PCT No.: PCT/KR2020/004311
§ 371 (c)(1),
(2) Date: Sep. 27, 2021

(87) PCT Pub. No.: WO2020/204522
PCT Pub. Date: Oct. 8, 2020

(65) Prior Publication Data
US 2022/0182888 A1 Jun. 9, 2022

(30) Foreign Application Priority Data

Mar. 29, 2019 (KR) .................. 10-2019-0037367
May 16, 2019 (KR) .................. 10-2019-0057731

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0268* (2013.01); *H04W 28/10* (2013.01); *H04W 76/20* (2018.02)

(58) Field of Classification Search
CPC . H04W 28/10; H04W 28/24; H04W 28/0268; H04W 76/20; H04W 80/10
See application file for complete search history.

(56) References Cited

U.S. PATENT DOCUMENTS 10,542,454 B2 1/2020 Jheng et al.
11,109,262 B2 8/2021 Pan
(Continued)

FOREIGN PATENT DOCUMENTS

CN 109155933 A 1/2019
CN 109246173 A 1/2019
(Continued)

OTHER PUBLICATIONS

Ericsson, PDU Session Modification due to QoS Flow creation, S2-1813391, 3GPP TSG-SA WG2 Meeting #129bis, West Palm Beach, Florida, US, Nov. 30, 2018.
(Continued)

*Primary Examiner* — Kan Yuen
(74) *Attorney, Agent, or Firm* — Jefferson IP Law, LLP (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method for managing the quality of service (QoS) of a session by using an NAS protocol in a next-generation 5G communication environment.

8 Claims, 8 Drawing Sheets

(51) Int. Cl.
*H04W 28/10* (2009.01)
*H04W 76/20* (2018.01)

(56) References Cited

U.S. PATENT DOCUMENTS

| | | | |
|---|---|---|---|
| 11,582,350 B2* | 2/2023 | Zhou | H04W 28/0268 |
| 2019/0090298 A1 | 3/2019 | Abraham et al. | |
| 2019/0116517 A1* | 4/2019 | Liu | H04W 76/10 |
| 2019/0116518 A1* | 4/2019 | Stojanovski | H04L 67/14 |
| 2019/0253917 A1* | 8/2019 | Dao | H04W 28/0268 |
| 2019/0261211 A1 | 8/2019 | Wu et al. | |
| 2019/0313277 A1* | 10/2019 | Huang-Fu | H04W 76/20 |
| 2019/0364541 A1 | 11/2019 | Ryu | |
| 2020/0275305 A1* | 8/2020 | Huang-Fu | H04W 28/0268 |
| 2021/0105657 A1* | 4/2021 | Hu | H04W 76/11 |
| 2022/0022089 A1* | 1/2022 | Zhu | H04W 28/0268 |

FOREIGN PATENT DOCUMENTS

| | | |
|---|---|---|
| CN | 109286999 A | 1/2019 |
| CN | 109314921 A | 2/2019 |
| WO | 2018/008980 A1 | 1/2018 |

OTHER PUBLICATIONS

Intel, Support for Traffic Segregation, C1-188962, 3GPP TSG-CT WG1 Meeting #113, West Palm Beach (FL), USA, Dec. 3, 2018.
Huawei et al., QoS flow description to be added in PDU session modification command, C1-190576, 3GPP TSG-CT WG1 Meeting #114, Bratislava, Slovakia, Jan. 25, 2019.
Ericsson, 3GPP PS Data Off UE status change and congestion control in AMF—alternative 1, C1-191147, 3GPP TSG CT WG1 Meeting #115, Montreal (Canada), Mar. 1, 2019.
Samsung, Segregation flow, 3GPP TSG-CT WG1 Meeting #117 C1-193436, Reno (NV), USA, May 13-17, 2019.
Samsung, Precedence, 3GPP TSG-CT WG1 Meeting #117 C1-193435, Reno (NV), USA, May 13-17, 2019.
Chinese Office Action dated Dec. 11, 2023, issued in Chinese Office Action 202080026215.4.
Chinese Office Action dated May 8, 2024, issued in Chinese Office Action 202080026215.4.

* cited by examiner

QOS MANAGEMENT METHOD AND DEVICE USING NAS PROTOCOL

TECHNICAL FIELD

The disclosure relates to an apparatus for performing a method or a function of managing Quality of Service (QoS) of a session through a NAS protocol in a next-generation 5G communication environment.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, research on a method of managing Quality of Service (QoS) of a session using a NAS protocol is needed due to the development of a next-generation 5G communication environment.

DISCLOSURE OF INVENTION

Technical Problem

According to the appearance of 5G mobile communication, network entities have been divided into an AMF which is a management entity for managing mobility of the UE and an SMF which is an entity for managing a session. Accordingly, unlike an operation scheme in which an MME is involved in management in the conventional 4G LTE communication, entities for managing mobility and managing a session are separated from each other, and thus a communication scheme and a communication management scheme between the UE and network entities have changed. In 5G communication, via N3IWF for non 3GPP access, mobility management is performed through the AMF and session management is performed through the SMF. Further, through the AFM, not only the mobility management but also security-related information, which is an important element for mobility management, are handled. Meanwhile, in 4G, the MME performs mobility management and session management to manage the same. Entities for communication of 4G and 5G may exist in 5G communication as well as the 5G communication scheme, and 5G communication may be performed using some 4G communication entities in non stand alone architecture Accordingly, the disclosure proposes a method of managing session QoS using a Non Access Stratum (NAS) protocol in 5G communication when communication is performed using the NAS protocol.

Solution to Problem

In accordance with an aspect of the disclosure to solve the problem, a communication method of a UE in a wireless communication system includes: making a request for Quality of Service (QoS)-related information to a network; and receiving a response message of the request from the network.

In accordance with another aspect of the disclosure, a method of a UE in a system includes: transmitting a Protocol Data Unit (PDU) session modification request message for configuring a segregation QoS flow to a Session Management Function (SMF); and receiving a PDU session modification command message including an authorized QoS rule from the SMF, based on the PDU session modification request message.

Advantageous Effects of Invention

Through the disclosure, it is possible to efficiently manage session QoS and perform communication using a NAS protocol in a 5G communication environment.

MODE FOR THE INVENTION

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

That is, the following detailed description of embodiments of the disclosure will be mainly directed to the communication standards defined by 3GPP. However, based on determinations by those skilled in the art, the main idea of the disclosure may also be applied to other communication systems having similar technical backgrounds through some modifications without significantly departing from the scope of the disclosure.

Figure 1:
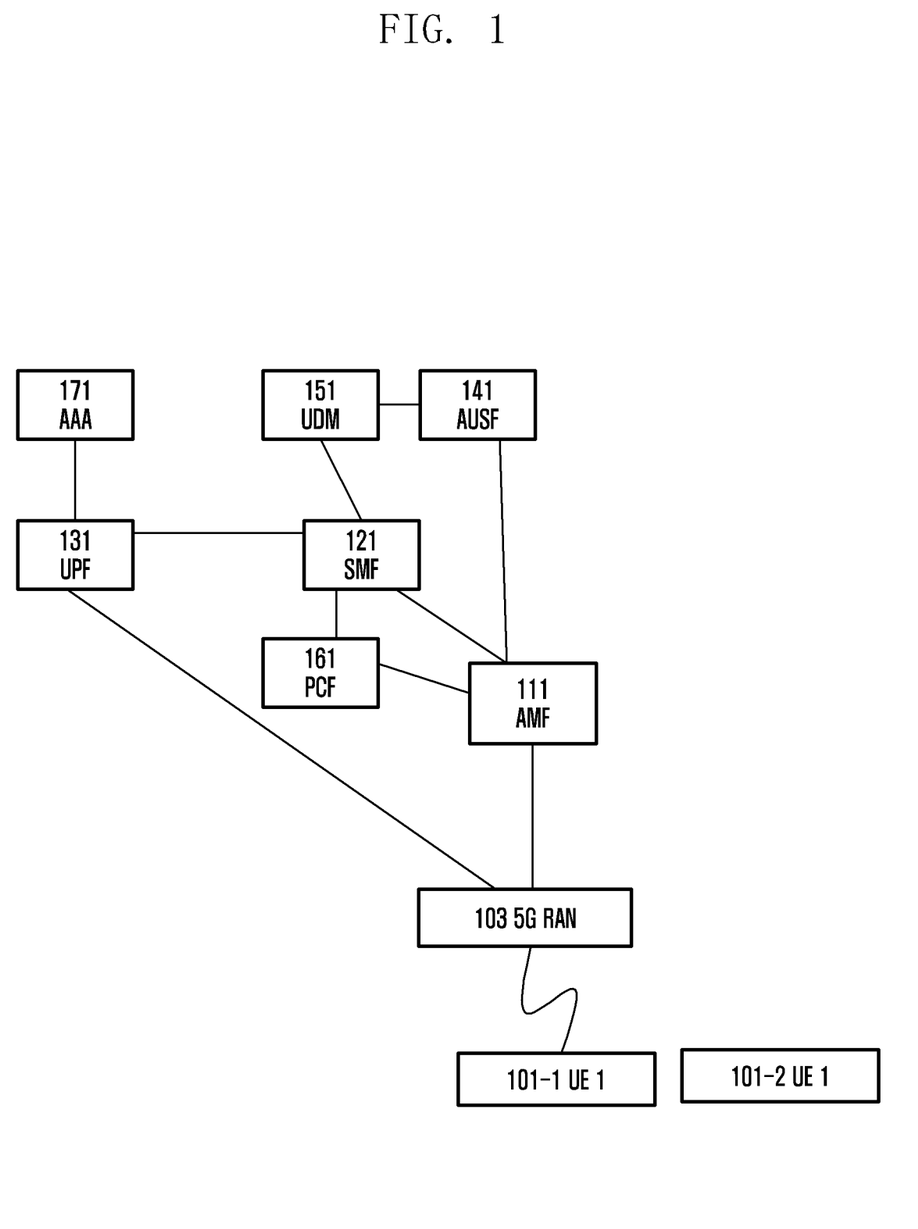
FIG. 1 illustrates an example of a UE and a network environment for managing session QoS of the UE and a network in a 5G network according to an embodiment of the disclosure.

FIG. 1 illustrates an example of UEs and a network environment for a communication procedure and a method of performing safe communication using some of 4G or 5G entities in a 5G or 4G network according to an embodiment of the disclosure.

In an embedment of the disclosure, based on the assumption of a 5G network, a User Plane Function (UPF), a Session Management Function (SMF), an Access and Mobility Management Function (AMF), a 5G Radio Access Network (RAN), a User Data Management (UDM), a Policy Control Function (PCF), and the like are included in a network system. Meanwhile, an Authentication Server Function (AUSF) and Authentication, Authorization, and Accounting (AAA) also exist in the system in order to authenticate the entities.

For the case in which the UE communicates through non-3GPP access, an N3 Interworking Function (N3IWF) exists. Through non-3GPP access, session management is controlled by the UE, the non-3GPP access, the N3IWF, and the SMF, and the control is performed through the UE, the non-3GPP access, the N3IWF, and the AMF for mobility management.

In an embodiment of the disclosure, it is assumed that 5G and 4G LTE systems coexist. In LTE, there is an MME for performing mobility management and session management. The MME controls communication of the UE. In 5G, mobility management and session management entities are divided into the AMF and the SMF. Meanwhile, the stand alone deployment structure for performing communication with only 5G communication entities for 5G communication and the non stand alone deployment structure using 4G and 5G entities for 5G communication are also considered.

As illustrated in FIG. 1, in communication between the UE and the network, the deployment in the form using an eNB and a 5G entity of a core network is possible for the control. In this case, while the UE and the AMF perform mobility management and the UE and the SMF perform session management for a NAS which is layer 3, the AS which is layer 2 is transmitted through the UE and the eNB, and thus a method of generating and managing security context is required. Accordingly, the disclosure describes generation and management of security context and exchange of a protocol which can be applied to such a deployment situation.

A communication network of the disclosure assumes networks of 5G and 4G LTE, but the communication network may be applied to the case in which the same concept is applied to another system within a range in which those skilled in the art can understand.

(Method 1)

Figure 2:
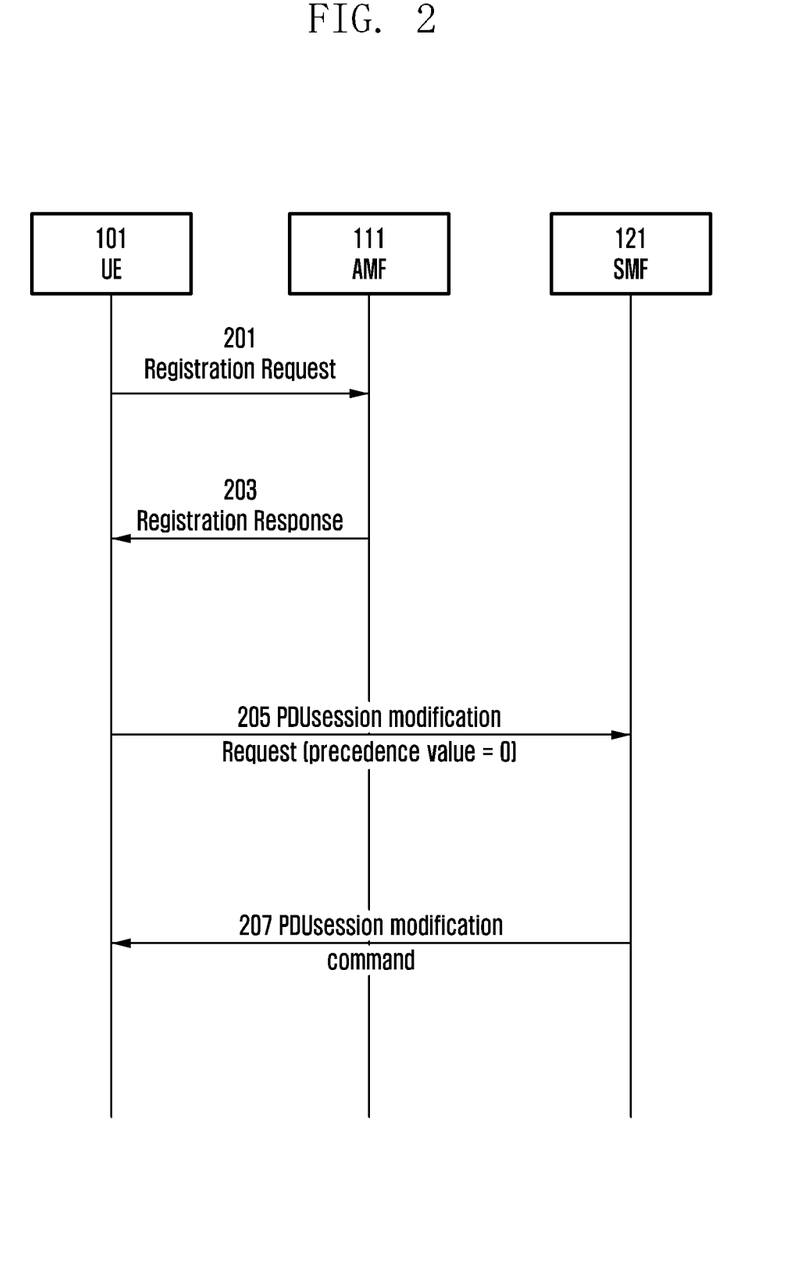
FIG. 2 illustrates an embodiment for processing management of QoS of a session of the UE and the network, and a communication procedure and method using a NAS protocol in a 5G network environment according to an embodiment of the disclosure.

FIG. 2 illustrates an embodiment for processing management of QoS of a session of the UE and the network, and a communication procedure and method using a NAS protocol in a 5G network environment according to an embodiment of the disclosure.

In operation 201, the UE transmits a registration request message to the AMF.

In operation 203, the AMF transmits a registration response message to the UE.

Thereafter, operation 205 is related to a request for segregation QoS flow by the UE. For example, when the UE makes a request for segregation QoS flow in operation 205, the UE may make a request for a QoS flow configuration which the UE desires to the network through a Protocol Data Unit (PDU) session modification transmission and the network may allow or approve the requested QoS flow.

Precedence may be a value for configuring a priority for the flow by the network. Further, precedence may be a value used for managing each flow by the network. A value which the UE transmits when the precedence is configured may be a reference value when the network manages the flow. Meanwhile, in another embodiment, when the UE informs of flows for an application executed in a background and traffic or an application which should be transmitted with the best effort through a segregation bit in order to manage them with specific flows, the network may efficiently manage the corresponding flows.

According to an embodiment, when the UE makes a request for segregation flow, for example, when the segregation bit is set as 1 and is segregation-requested while the UE transmits the PDU session modification request to the SMF, the UE may set a QoS rule precedence field of a requested QoS rule information element in the PDU session modification request message as 0 (decimal) and transmit the PDU session modification request message.

According to another embodiment, when the UE makes a request for segregation flow, for example, when the segregation bit is set as 1 and is segregation-requested, that is, when segregation is requested while the UE transmits the PDU session modification request to the SMF, the UE may set a QoS rule precedence field of a requested QoS rule information element in the PDU session modification request message as a specific value except for 80 (decimal) between 70 and 99 (decimal) and transmit the PDU session modification request message.

The operation in which the UE makes a request for the segregation flow is expressed in English below.

TABLE 200

PIf the UE requests a QoS rule and the UE sets segregation bit to 1 to request the network to bind service data flows described by the QoS rule to a dedicated QoS Flow, the UE shall assign a precedence value for the signalled QoS rule which value is 0.
If the UE requests a QoS rule and the UE sets segregation bit to 1 to request the network to bind service data flows described by the QoS rule to a dedicated QoS Flow, the UE shall assign a precedence value for the signaled QoS rule which is the specific value not belong to in the range from 70 to 99 (decimal) or not 80 (decimal).

The UE may set the precedence value as 0 or a specific value in the DU session modification request message and transmit the message to the SMF. For example, the UE may set the precedence value of the requested QoS rules information element of the PDU session modification request as 0 or a specific value and transmit the message to the SMF.

According to another embodiment, since the precedence value is a value that is set and transmitted by the network, the UE may set a precedence value field in the PDU session modification request message as 0 and may or may not transmit the message to the SMF.

In operation 205, the UE may transmit the PDU session modification request message to the SMF via the AMF.

TABLE 1

| | | PDU session modification request | | | |
|---|---|---|---|---|---|
| IEI | Information Element | Type/Reference | Presence | Format | Length |
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION MODIFICATION REQUEST message identity | Message type | M | V | 1 |
| | 5GSM capability | 5GSM capability | O | TLV | 3-15 |
| | 5GSM cause | 5GSM cause | O | TV | 2 |
| | Maximum number of supported packet filters | Maximum number of supported packet filters | O | TV | 3 |
| | Always-on PDU session requested | Always-on PDU session requested | O | TV | 1 |
| | Integrity protection maximum data rate | Integrity protection maximum data rate | O | TV | 3 |
| | Requested QoS rules | QoS rules | O | TLV-E | 7-65538 |
| | Requested QoS flow descriptions | QoS flow descriptions | O | TLV-E | 5-65538 |

TABLE 1-continued

PDU session modification request

| IEI | Information Element | Type/Reference | Presence | Format | Length |
|---|---|---|---|---|---|
| | Mapped EPS bearer contexts | Mapped EPS bearer contexts | O | TLV-E | 7-65538 |
| | Extended protocol configuration options | Extended protocol configuration options | O | TLV-E | 4-65538 |

In operation 207, the SMF transmits a PDU session modification command to the UE.

TABLE 2

PDU session modification command
PDU SESSION MODIFICATION COMMAND message content

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION MODIFICATION COMMAND message identity | Message type | M | V | 1 |
| | 5GSM cause | 5GSM cause | O | TV | 2 |
| | Session AMBR | Session-AMBR | O | TLV | 8 |
| | RQ timer value | GPRS timer | O | TV | 2 |
| | Always-on PDU session indication | Always-on PDU session indication | O | TV | 1 |
| | Authorized QoS rules | QoS rules | O | TLV-E | 7-65538 |
| | Mapped EPS bearer contexts | Mapped EPS bearer contexts | O | TLV-E | 7-65538 |
| | Authorized QoS flow descriptions | QoS flow descriptions | O | TLV-E | 6-65538 |
| | Extended protocol configuration options | Extended protocol configuration options | O | TLV-E | 4-65538 |

TABLE 3

QoS rule: precedence value

| 8 | 7 | 6 | 5 | 4 | 3 | 2 | 1 | |
|---|---|---|---|---|---|---|---|---|
| | | | QoS rule identifier | | | | | octet 4 |
| | | | Length of QoS rule | | | | | octet 5 |
| | | | | | | | | octet 6 |
| Rule operation code | | | DQR bit | Number of packet filters | | | | octet 7 |
| | | | Packet filter list | | | | | octet 8* |
| | | | | | | | | octet m* |
| | | | QoS rule precedence | | | | | octet z + 1* |
| 0 Spare | | Segregation | | QoS flow identifier (QFI) | | | | octet z + 2* |
| | | | QoS rule (u = z + 2) | | | | | |

TABLE 4

QoS rule analysis method

QoS rules information element

QoS rule precedence (octet z + 1)
The QoS rule precedence field is used to specify the precedence of the QoS rule among all QoS rules Segregation bit (bit 7 of octet m + 2)

| Bit | |
|---|---|
| 7 | |
| 0 | Segregation not requested |
| 1 | Segregation requested |

(Method 2)

Figure 3:
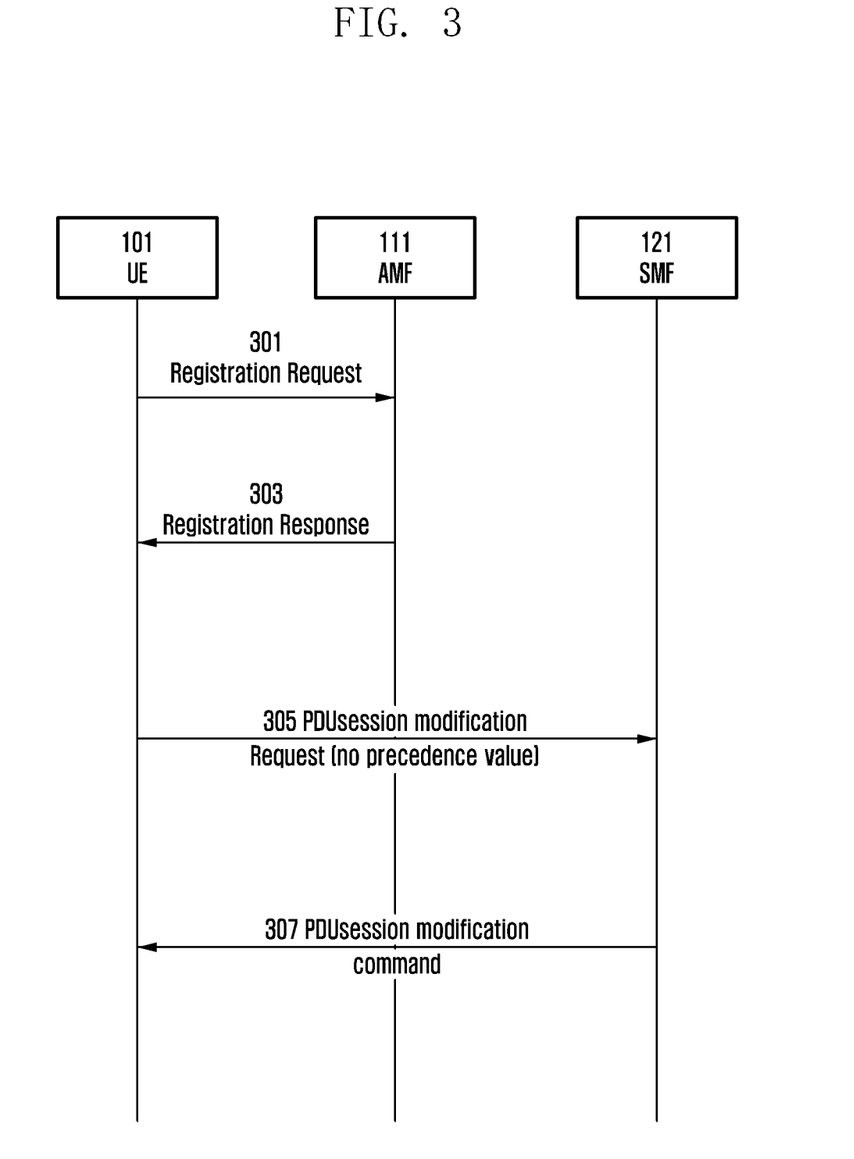
FIG. 3 illustrates an embodiment for processing management of QoS of a session of the UE and the network, and a communication procedure and method using a NAS protocol in a 5G network environment according to an embodiment of the disclosure.

FIG. 3 illustrates an embodiment for processing management of QoS of a session of the UE and the network, and a communication procedure and method using a NAS protocol in a 5G network environment according to an embodiment of the disclosure.

In operation 301, the UE transmits a registration request message to the AMF.

In operation 303, the AMF transmits a registration response message to the UE.

In operation 305, the UE transmits the PDU session modification request message to the SMF via the AMF.

The following operation is related to a request for segregation QoS flow by the UE. For example, in the process in which the UE makes a request for segregation QoS flow, the UE may make a request for a QoS flow configuration which the UE desires through a PDU session modification process and the network may allow the requested QoS flow.

Precedence may be a value for configuring a priority for the flow by the network. Further, precedence may be a value used for managing each flow by the network. A value which the UE transmits when the precedence is configured may be a reference value when the network manages the flow. Meanwhile, in another embodiment, when the UE informs of flows for an application executed in a background and traffic or an application which should be transmitted with the best effort through a segregation bit in order to manage them with specific flows, the network may efficiently manage the corresponding flows.

At this time, the UE may transmit the PDU session modification request message without the precedence value to the SMF.

In other words, the UE may not transmit the precedence value to the SMF.

Since the precedence value is a value set and transmitted by the network, a precedence value field in the PDU session modification request message transmitted by the UE may be set as 0 and transmitted to the SMF or the UE may not transmit the precedence value in an embodiment.

According to an embodiment, when the UE makes a request for segregation flow, for example, when the segregation bit is set as 1 and is segregation-requested while the UE transmits the PDU session modification request to the SMF, the precedence is not included in the PDU session modification request message. That is, the UE may transmit the PDU session modification request message without the precedence value to the SMF according to an embodiment. In other words, the UE may transmit the PDU session modification request which does not contain the precedence value of the requested QoS rules information element to the SMF.

In operation 307, the SMF transmits a PDU session modification command to the UE.

(Method 3, Case 1) Segregation Flow Reuse

Figure 4:
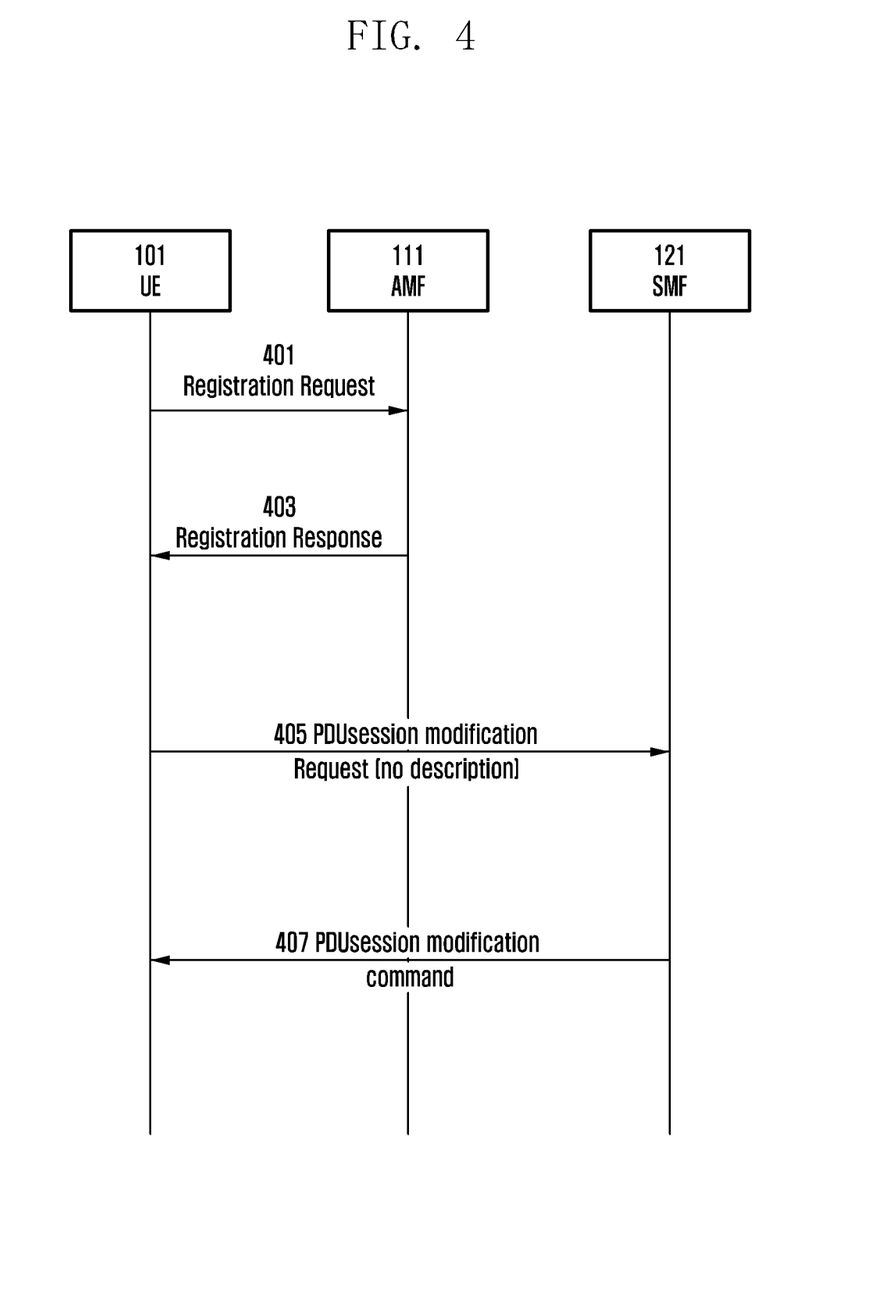
FIG. 4 illustrates an embodiment for processing management of QoS of a session of the UE and the network, and a communication procedure and method using a NAS protocol in a 5G network environment according to an embodiment of the disclosure.

FIG. 4 illustrates an embodiment for processing management of QoS of a session of the UE and the network, and a communication procedure and method using a NAS protocol in a 5G network environment according to an embodiment of the disclosure.

Hereinafter, the case in which generation of segregation flow is requested again by the UE after generation of the segregation flow is requested by the UE in a previous process will be described. When there is a segregation flow by the previous process, only one segregation flow is allowed, and thus the UE cannot make a request for additionally generating the segregation flow.

However, when the segregation flow has been already generated, the conventional segregation flow may be reused. For example, the UE may reuse the previous segregation flow without a QoS parameter of the segregation flow in order to reuse the previous segregation flow.

In operation 401, the UE transmits a registration request message to the AMF.

In operation 403, the AMF transmits a registration response message to the UE.

In operation 405, the UE transmits the PDU session modification request message to the SMF via the AMF.

The following operation is related to a request for segregation QoS flow by the UE. According to an embodiment of the disclosure, when the UE makes a request for segregation QoS flow in operation 405, the UE may make a request for a QoS flow configuration which the UE desires to the network through PDU session modification transmission and the network may allow the requested QoS flow.

According to an embodiment, when the UE informs of flows for an application executed in a background and traffic or an application which should be transmitted with the best effort through a segregation bit in order to manage them with specific flows, the network may efficiently manage the corresponding flows.

At this time, according to an embodiment, since the number of segregation QoS flows for which the UE can make a request is only 1, if there is a pre-defined segregation flow, the PDU session modification request message which the UE transmits to the SMF does not include a QoS parameter to be allocated in order to make a request for additionally allocating the service data flow to the corresponding segregation QoS flow by the UE.

For example, when the segregation bit is set as 1 and is segregation-requested, that is, when the segregation is requested in the PDU session modification request message transmitted to the SMF, if a requested QoS flow identifier is the same as a QoS flow identifier previously requested through the segregation QoS flow, requested QoS flow descriptions included in the PDU session modification request message which the UE transmits to the SMF do not include a QoS parameter for the QoS flow identifier.

Alternatively, in an embodiment, when the segregation bit is set as 1 and is segregation-requested in the PDU session modification request message which the UE transmits to the SMF and a requested QoS flow identifier is the same as a QoS flow identifier previously requested through the segregation QoS flow, the UE may not insert a QoS flow description into a QoS flow identifier of requested QoS flow descriptions included in the PDU session modification request message and transmit the message to the SMF.

In operation 407, the SMF transmits a PDU session modification command to the UE.

Figure 5:
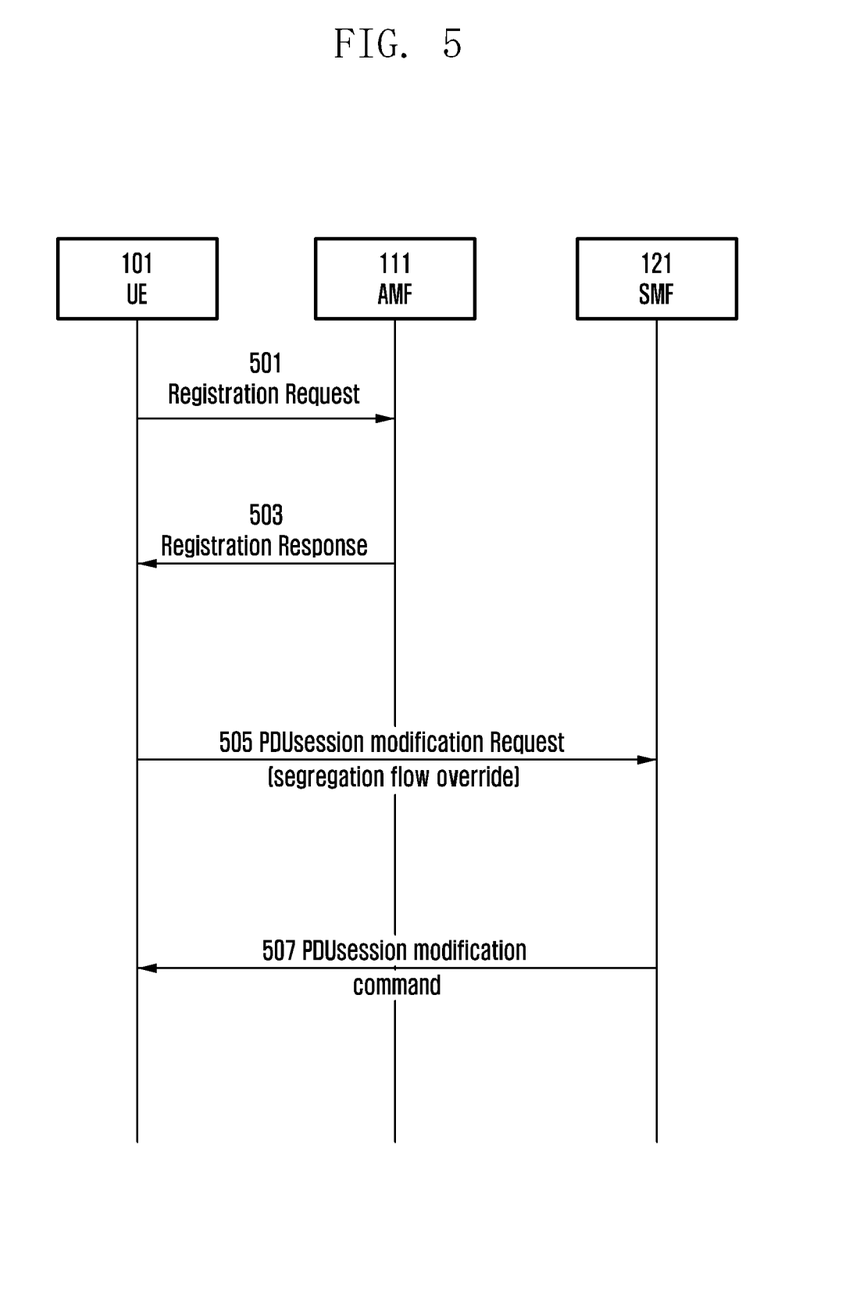
FIG. 5 illustrates an embodiment for processing management of QoS of a session of the UE and the network, and a communication procedure and method using a NAS protocol in a 5G network environment according to an embodiment of the disclosure.

(Method 4, Case 2) the Case in which Segregation Flow is Reused and a QoS Parameter is Included FIG. 5 illustrates an embodiment for processing management of QoS of a session of the UE and the network, and a communication procedure and method using a NAS protocol in a 5G network environment according to an embodiment of the disclosure.

Hereinafter, the case in which generation of segregation flow is requested again by the UE after generation of the segregation flow is requested by the UE in a previous process will be described. When there is a segregation flow by the previous process, only one segregation flow is allowed, and thus the UE cannot make a request for additionally generating the segregation flow.

However, when the segregation flow has been already generated, the UE may insert a QoS parameter into the PDU session modification message and transmit the message to the SMF in order to reuse the segregation flow. For example, IDs of the segregation flows are the same but characteristics for QoS are different.

In operation 501, the UE transmits a registration request message to the AMF.

In operation 503, the AMF transmits a registration response message to the UE.

In operation 505, the UE transmits the PDU session modification request message to the SMF via the AMF.

The following operation is related to a request for segregation QoS flow by the UE. According to an embodiment of the disclosure, when the UE makes a request for segregation QoS flow in operation 505, the UE may make a request for a QoS flow configuration which the UE desires to the network through PDU session modification transmission and the network may allow the requested QoS flow.

That is, when the UE informs of specific flows, for example, flows for an application executed in a background and traffic or an application which should be transmitted with the best effort through a segregation bit in order to manage them with specific flows, the network may efficiently manage the corresponding flows.

At this time, according to an embodiment, since the number of segregation QoS flows for which the UE may make a request is only 1, when there is a pre-defined segregation flow, the UE may insert a QoS parameter to be allocated into the PDU session modification request message to make a request for additionally allocating the service data flow to the corresponding segregation QoS flow to the SMF, transmit the message to the SMF, and change and use a QoS-related characteristic of the conventional segregation QoS flow.

For example, when the segregation bit is set as 1 and is segregation-requested, that is, when the segregation is requested in the PDU session modification request message which the UE transmits to the SMF, if a requested QoS flow identifier is the same as a QoS flow identifier previously requested through the segregation QoS flow, the UE may not insert a QoS parameter to be allocated into a QoS flow identifier of requested QoS flow descriptions included in the PDU session modification request message and transmit the message to the SMF. At this time, the conventional flow characteristic may be changed or may be used without any change.

For example, when the segregation bit is set as 1 and is segregation-requested in the PDU session modification request message transmitted to the SMF, if a requested QoS flow identifier is the same as a QoS flow identifier previously requested through the segregation QoS flow, the UE may change QoS flow description in connection with the QoS flow identifier and transmit the PDU session modification request message including the changed QoS flow description to the SMF. At this time, the UE uses the same segregation flow but may change and use a characteristic thereof.

In operation 507, the SMF transmits a PDU session modification command to the UE.

Figure 6:
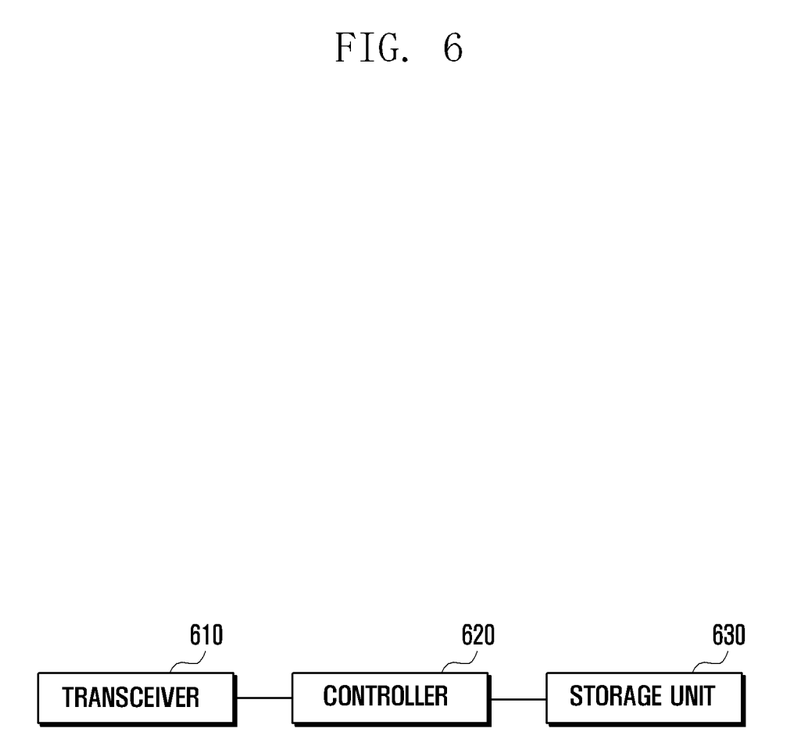
FIG. 6 illustrates a structure of a UE according to an embodiment of the disclosure.

FIG. 6 illustrates a structure of a UE according to an embodiment of the disclosure.

Referring to FIG. 6, the UE may include a transceiver 610, a controller 620, and a storage unit 630. In the disclosure, the controller may be defined as a circuit, an application-specific integrated circuit, or at least one processor.

The transceiver 610 may transmit/receive a signal to/from another network entity. The transceiver 610 may receive, for example, system information from the BS and receive a synchronization signal or a reference signal.

The controller 620 may control the overall operation of the UE according to an embodiment proposed by the disclosure. For example, the controller 620 may control a signal flow between blocks to perform the operation according to the above-described flowchart.

The storage unit 630 may store at least one piece of information transmitted and received through the transceiver 610 and information generated through the controller 620.

Figure 7:
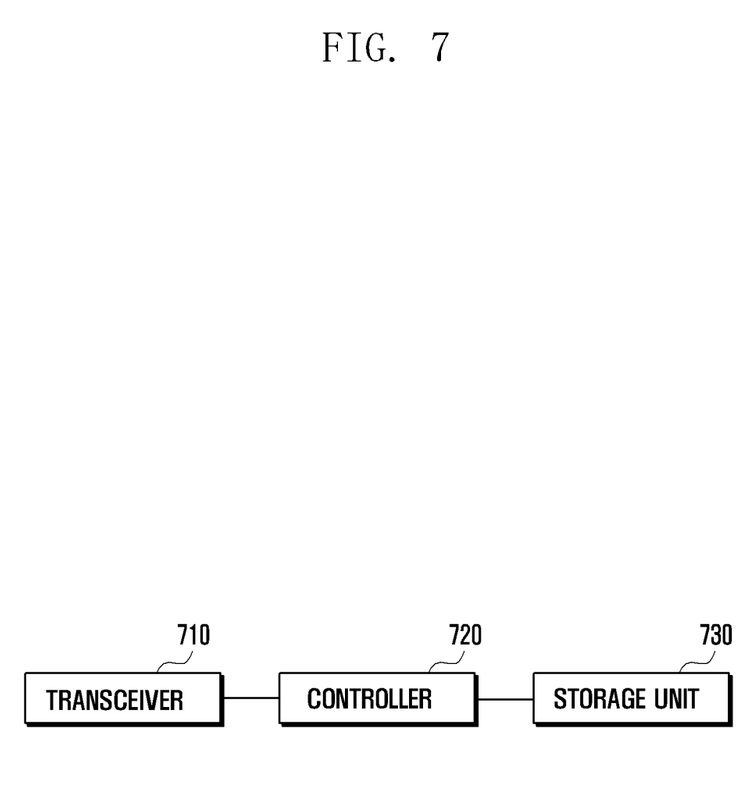
FIG. 7 illustrates a structure of a network entity according to an embodiment of the disclosure.

FIG. 7 illustrates a structure of a network entity according to an embodiment of the disclosure.

The network entity illustrated in FIG. 7 may be one of the entities illustrated in FIGS. 1 to 5 and FIG. 8. For example, the network entity may be the AMF or the SMF illustrated in FIGS. 1 to 5 and FIG. 8.

Referring to FIG. 7, the network entity may include a transceiver 710, a controller 720, and a storage unit 730. In the disclosure, the controller may be defined as a circuit, an application-specific integrated circuit, or at least one processor.

The transceiver 710 may transmit and receive signals to and from the UE or another network entity. The controller 720 may control the overall operation of the eNB according to an embodiment proposed by the disclosure. For example, the controller 720 may control a signal flow between blocks to perform the operation according to the above-described flowchart. The storage unit 730 may store at least one piece of information transmitted and received through the transceiver 710 and information generated through the controller 720.

(Method 5)

Figure 8:
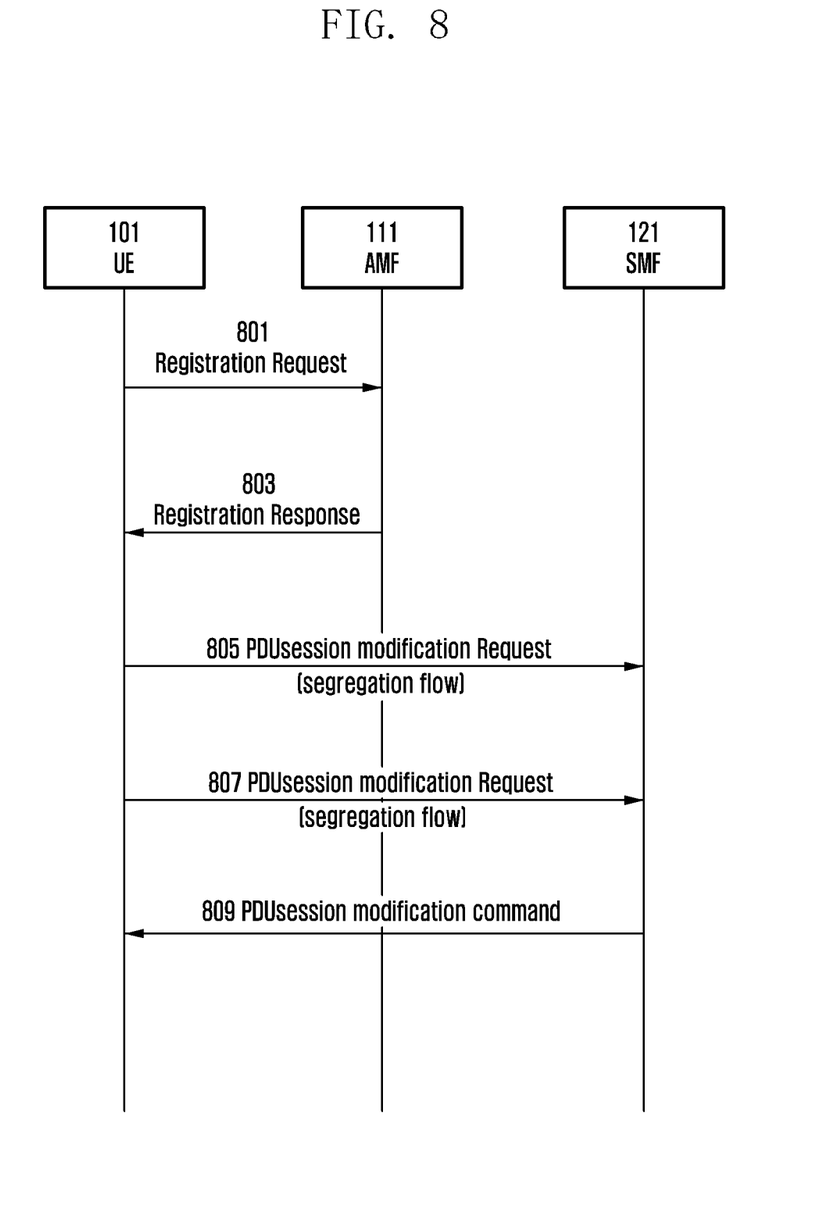
FIG. 8 illustrates an embodiment for processing managing QoS of a session of the UE and the network, and a communication procedure and method using a NAS protocol in a 5G network environment according to an embodiment of the disclosure.

FIG. 8 illustrates an embodiment for processing management of QoS of a session of the UE and the network, and a communication procedure and method using a NAS protocol in a 5G network environment according to an embodiment of the disclosure.

Hereinafter, the case in which the network uses only a single dedicated QoS flow for traffic segregation will be described. That is, when the UE makes a request for traffic segregation for multiple service data flows for processing other QoS, the SMF binds (maps) the multiple service data flows to the single QoS flow. Accordingly, the SMF should generate a new authorized QoS rule for the single QoS flow and allow traffic segregation for the service data flow on the basis of the new authorized QoS rule. Further, the SMF should delete packet filters for the service data flow included in the segregation flow from other authorized QoS rules.

In operation 801, the UE transmits a registration request message to the AMF.

In operation 803, the AMF transmits a registration response message to the UE.

In operation 805, the UE transmits the PDU session modification request message to the SMF via the AMF.

The following operation is related to a request for a segregation QoS flow by the UE. For example, when the UE makes a request for segregation QoS flow in operation 805, the UE may make a request for a QoS flow configuration which the UE desires to the network through PDU session modification transmission and the network may allow the requested QoS flow. When the UE informs of specific flows, for example, flows for an application executed in a background and traffic or an application which should be transmitted with the best effort through a segregation bit in order to manage them with specific flows, the network may efficiently manage the corresponding flows.

According to an embodiment, in order to make a request for additionally allocating the service data flow to the corresponding segregation QoS flow, the UE sets the segregation bit included in the PDU session modification request message as 1 and transmits the message to the SMF.

the QoS flow. Accordingly, when the authorized QoS rule newly generated by the SMF is generated for the dedicated QoS flow for traffic segregation, the SMF generates a new authorized QoS rule, inserts the new authorized QoS flow description into the authorized QoS flow description IE in the PDU Session modification command message, and transmits the message to the UE.

This is expressed in English below.

TABLE 800

If SMF creates a new authorized QoS rule for a new QoS flow, then SMF shall include the authorized QoS flow description for that QoS flow in the authorized QoS flow descriptions IE of the PDU SESSION MODIFICATION COMMAND message, if:
d) the newly created authorized QoS rule is for a dedicated QoS flow for a traffic segregation That is, in an embodiment, when the segregation bit is set as 1 and is segregation-requested, that is, when the segregation is requested in the PDU Session modification request message which the UE transmits to the SMF, the UE may insert a characteristic for QoS flow into an information element (parameter) corresponding to requested QoS flow descriptions included in the PDU session modification request message and transmit the message to the SMF.

At this time, a QoS flow identifier included in the QoS rule information element in the PDU session modification request message may be an existing QoS Flow Identifier which the network allocates to the UE and is then stored therein.

Alternatively, the QoS flow identifier included in the QoS rule information element in the PDU session modification request message may be spare or 0.

In operation 807, the UE transmits another PDU session modification request to the SMF.

At this time, the UE may make a request for another service data flow through the segregation flow. For example, the UE may set the segregation bit as 1 in the QoS rule information element of the PDU session modification message and transmit the PDU session modification request to the SMF.

In operation 809, the SMF transmits a PDU session modification command to the UE.

At this time, when the UE makes a request for traffic segregation for multiple service data flows for processing other QoS in operations 805 and 807, the SMF binds (maps) the multiple service data flows with (to) the single QoS flow. Accordingly, the SMF should generate a new authorized QoS rule for the single QoS flow and allow traffic segregation for the service data flow on the basis of the new authorized QoS rule. The SMF should delete packet filters for the service data flow included in the segregation flow from other authorized rules.

Accordingly, the SMF should generate a new QoS flow and include an authorized QoS flow description for the QoS flow. At this time, a condition under which the SMF generates a new authorized QoS rule and inserts a new authorized QoS flow description into an authorized QoS flow description IE in a PDU session modification command message is described below.

The case in which the newly generated authorized QoS rule is generated for dedicated QoS flow for traffic segregation.

That is, when the newly generated authorized QoS rule is generated for the dedicated QoS flow for traffic segregation, the SMF should generate a new QoS flow and insert an authorized QoS flow description information element into In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of a terminal in a wireless communication system, the method comprising:
   transmitting, to a Session Management Function (SMF), a Protocol Data Unit (PDU) session modification request message, wherein the PDU modification request message includes information on a requested quality of service (QoS) rule; and
   receiving, from the SMF, a PDU session modification command message as a response to the PDU session modification request message,
   wherein the information on the requested QoS rule includes bit information on segregation and information on a precedence value of the requested QoS rule among at least one of QoS rule,
   wherein the bit information on segregation indicates whether the terminal is requesting to bind service data flows described by the QoS rule to a dedicated QoS flow, and
   wherein in case that the UE requests a new QoS rule, the precedence value is assigned not in the range from 70 to 99.

2. The method of claim 1, wherein in case that the bit information on segregation is set to 1, the terminal requests the SMF to bind the at least one of the service data flow described by the requested QoS rule to the dedicated QoS flow.

3. A method of a Session Management Function (SMF) in a wireless communication system, the method comprising:
   receiving, from a terminal, a Protocol Data Unit (PDU) session modification request message, wherein the PDU modification request message includes information on a requested quality of service (QoS) rule, and the information on the requested QoS rule includes bit information on segregation and information on precedence value of the requested QoS rule among at least one of QoS rule; and transmitting, to the terminal, a PDU session modification command message, wherein the bit information on segregation indicates whether the terminal is requesting to bind service data flows described by the QoS rule to a dedicated QoS flow, and wherein in case that the UE requests a new QoS rule, the precedence value is assigned not in the range from 70 to 99.

4. The method of claim 3, wherein, in case that the bit information on segregation is set to 1, the terminal requests the SMF to bind the at least one of the service data flow described by the requested QoS rule to the dedicated QoS flow.

5. A terminal in a wireless communication system, the terminal comprising:

a transceiver; and a controller configured to:

transmit, to a session management function (SMF) via the transceiver, a Protocol Data Unit (PDU) session modification request message, wherein the PDU modification request message includes information on a requested quality of service (QoS) rule, and receive, from the SMF via the transceiver, a PDU session modification command message as a response to the PDU session modification request message, wherein the information on the requested QoS rule includes bit information on segregation and information on a precedence value of the requested QoS rule among at least one of QoS rule, wherein the bit information on segregation indicates whether the terminal is requesting to bind service data flows described by the QoS rule to a dedicated QoS flow, and wherein in case that the UE requests a new QoS rule, the precedence value is assigned not in the range from 70 to 99.

6. The terminal of claim 5, wherein, in case that the bit information on segregation is set to 1, the terminal requests the SMF to bind the at least one of the service data flow described by the requested QoS rule to the dedicated QoS flow.

7. A Session Management Function (SMF) in a wireless communication system, the SMF comprising:

a transceiver; and a controller configured to: receive, from a terminal via the transceiver, a Protocol Data Unit (PDU) session modification request message, wherein the PDU modification request message includes information on a requested quality of service (QoS) on segregation and information on a precedence value of the requested QoS rule among at least one of QoS rule, and transmit, to the terminal via the transceiver, a PDU session modification command message, wherein the bit information on segregation indicates whether the terminal is requesting to bind service data flows described by the QoS rule to a dedicated QoS flow, and wherein in case that the UE requests a new QoS rule, the precedence value is assigned not in the range from 70 to 99.

8. The SMF of claim 7, wherein, in case that the bit information on segregation is set to 1, the terminal requests the SMF to bind the at least one of the service data flow described by the requested QoS rule to the dedicated QoS flow.

* * * * *